United States Patent [19]

Mandelboum et al.

[11] Patent Number: 5,113,281

[45] Date of Patent: May 12, 1992

[54] DUAL FIELD OF VIEW OPTICAL SYSTEM

[75] Inventors: David Mandelboum; Itshak Marom, both of Haifa; Yitzhak Nevo, Mobile Post Ein Harod, all of Israel

[73] Assignee: State of Isreal-Ministry of Defence Armg332 2evelopment Authority, Israel

[21] Appl. No.: 327,325

[22] Filed: Mar. 22, 1989

[30] Foreign Application Priority Data

Mar. 29, 1988 [IL] Israel .................................. 85908

[51] Int. Cl.$^5$ ...................... G02B 26/02; G02B 17/00
[52] U.S. Cl. ..................................... 359/236; 359/361; 359/365
[58] Field of Search ................. 350/1.5, 6.5, 512, 519, 350/561, 134, 414–419, 438, 244, 247, 610, 359/363, 500–506, 522–560, 582–584, 339 F, 343–344, 349, 390, 391, 266–267, 355, 311–312, 320–321; 359/227–236, 350–366, 665–666, 725–740

[56] References Cited

U.S. PATENT DOCUMENTS

| | | | |
|---|---|---|---|
| 3,326,621 | 6/1967 | Nygorden | 350/418 |
| 3,761,158 | 9/1973 | Humphrey | 350/500 |
| 3,860,811 | 1/1975 | Slauter | 350/418 |
| 4,037,939 | 6/1977 | Latady | 350/241 |
| 4,043,638 | 8/1977 | Kaufmann | 350/418 |
| 4,286,839 | 9/1981 | Ilzig et al. | 350/418 |
| 4,334,736 | 6/1982 | Herbert | 350/418 |
| 4,354,742 | 10/1982 | Abel | 350/442 |
| 4,466,705 | 8/1984 | Michelson | 350/418 |
| 4,877,317 | 10/1989 | Gibbons et al. | 350/559 |
| 4,989,962 | 2/1991 | Kebo | 350/537 |

FOREIGN PATENT DOCUMENTS

| | | |
|---|---|---|
| 0051970 | 11/1981 | European Pat. Off. . |
| 0169116 | 6/1985 | European Pat. Off. . |
| 0145845 | 8/1986 | European Pat. Off. . |
| 3444753 | 12/1984 | Fed. Rep. of Germany . |
| 1387580 | 10/1967 | United Kingdom . |
| 1318042 | 5/1970 | United Kingdom . |
| 1423257 | 5/1973 | United Kingdom . |
| 2082789 | 8/1981 | United Kingdom . |

Primary Examiner—Bruce Y. Arnold
Assistant Examiner—Thong Nguyen
Attorney, Agent, or Firm—Marshall, O'Toole, Gerstein, Murray & Bicknell

[57] ABSTRACT

An optical system for transmitting light from an object in a dual field of view, the system comprising optical elements providing alternate optical paths associated with each of a wide and a narrow field of view, at least a portion of the optical paths being in alignment, there being disposed within the aligned portion of the optical paths a blocking element selectably operable to enable passage of the light from the object which is associated with one of the alternate optical paths while simultaneously blocking passage of the light associated with the other alternate optical path.

17 Claims, 5 Drawing Sheets

DUAL FIELD OF VIEW OPTICAL SYSTEM

FIELD OF THE INVENTION

The present invention relates to an optical system having a dual field of view, more particularly, to an optical system in which a variation in the field of view is achieved by a blocking element selectively operable to simultaneously enable and block passage of light in alternate optical paths.

BACKGROUND OF THE INVENTION

There are known optical systems for providing a variable field of view, such as a catadioptric optical system providing discrete wide and narrow fields of view by movement of optical elements into and out of the optical path. The movement of these elements is accomplished by complex mechanical linkages of optical components.

An example of this type of system is disclosed in U.S. Pat. No. 4,354,742 to Abel et al., based on the movement of a secondary mirror in and out of the path of a fixed objective. Another example of this approach is disclosed in European Patent Application 84110278.2, based on a secondary reflector which is pivoted by means of an actuator cable for movement from a narrow to a wide field of view position. Still another example of this arrangement is found in British Patent No. 1,423,257, where a rotatable lens is used.

The aforementioned European Patent Application also discloses an embodiment in which the secondary reflector is replaced by a material such as vanadium oxide which, when heated by an electrical circuit, changes from a transparent body to a reflector body. The vanadium oxide or any such reflective and transparent element has the disadvantage that it is neither completely transparent nor completely reflective. Due to the fact that this element is not completely transmissive in the wide field of view as disclosed in the subject application at page 6, lines 13-16, there is interference by reflection of the narrow field of view light from this element. Although it is stated that the radiant energy of reflection is very low, the interference is significant. Thus, the overall performance of the optical system is reduced.

Applications of a dual field of view system using movable lenses are also found in cameras, as disclosed in German Patent No. DE 3,444,753 and U.S. Pat. No. 4,037,939.

In stabilized platform applications, where the system is highly sensitive to the static balance, mechanical complexity of the aforementioned systems introduces unwanted disturbances.

Therefore, it would be desirable to provide a reliable dual field of view optical system which is based on a simplified optical arrangement.

SUMMARY OF THE INVENTION

Accordingly, it is a principal object of the present invention to overcome the above-described disadvantages and provide an optical system having a dual field of view based on the operation of a blocking element in the optical path. The invention provides a simplified optical arrangement operating with minimal disturbances to the static balance of the optical system in stabilized platform applications.

In accordance with a preferred embodiment of the invention, there is provided an optical system for transmitting light from an object in a dual field of view, the system comprising optical elements providing alternate optical paths associated with each of a wide and a narrow field of view, at least a portion of the optical paths being in alignment, there being disposed within the aligned portion of the optical paths a blocking element selectably operable to enable passage of the light from the object which is associated with one of the alternate optical paths while simultaneously blocking passage of the light associated with the other alternate optical path.

In the preferred embodiment, the blocking element comprises a fluid reflective layer which can be pumped into an air gap formed between two lenses located in the aligned portion of the alternate optical paths. The reflective layer is provided by a liquid material such as mercury which is stored in a circumferential channel about the lens pair, with the channel being connected to a cylinder within which a piston is used to provide pumping action. When pumped into the air gap from the channel, the reflective layer acts to block the light from the object which is associated with the wide field of view. Simultaneously, passage of the image light from the narrow field of view is enabled by reflection in a catadioptric arrangement into the aligned portion of the alternate optical paths.

When the fluid reflective layer is pumped out of the air gap and the air is restored therein, the blocking element loses its reflective capability and enables direct passage of the light associated with the wide field of view. Simultaneously, the light associated with the narrow field of view is no longer reflected and is thereby prevented from traveling further along the aligned portion of the alternate optical paths.

In an alternative embodiment, the blocking element comprises a liquid crystal device in the form of a disc having a central aperture which is enclosed by a circumferential ring. The central aperture and circumferential ring areas are each separately operable so as to exhibit opaque or transparent properties. Located in the aligned portion of the optical paths, the liquid crystal device can be operated so that the circumferential ring area is opaque and blocks the light associated with the narrow field of view while the transparent central aperture simultaneously enables passage of the light associated with the wide field of view.

When operated so that the circumferential ring area is transparent, passage of image light associated with the narrow field of view is enabled, and this light is reflected in a catadioptric arrangement into the aligned portion of the optical paths. Simultaneously, the light associated with the wide field of view is blocked by the central aperture which is opaque.

In still another alternative embodiment, the blocking element comprises a pivotably movable disc-ring construction of thin opaque material having a central disc with magnetic properties fixedly mounted within a circumferential ring in orthogonal orientation therewith. Located in the aligned portion of the alternate optical paths, the ring-disc construction can be pivoted by application of a magnetic field so that the opaque ring portion blocks the light associated with the narrow field of view. In simultaneous fashion, the plane of the central disc portion is then oriented parallel to the optical path associated with the wide field of view and passage of the light therein is enabled.

When the central disc portion is pivoted so as to block the light associated with the wide field of view, the ring portion is then oriented parallel to the optical path associated with the narrow field of view and passage of the light therein is enabled, and this light is reflected in a catadioptric arrangement into the aligned portion of the alternate optical paths.

In all of the embodiments, the inventive optical system operates with minimal disturbance to the static balance which enables application in stabilized platform systems and stabilized sensor equipment, thereby offering a simplified solution in optical systems for military and commercial use.

Other features and advantages of the invention will become apparent from the following drawings and description.

BRIEF DESCRIPTION OF THE DRAWINGS

For a better understanding of the invention, reference is made to the accompanying drawings, in which like numerals refer to corresponding elements or sections throughout, and in which.

DETAILED DESCRIPTION OF THE PREFERRED EMBODIMENTS

Figure 1:
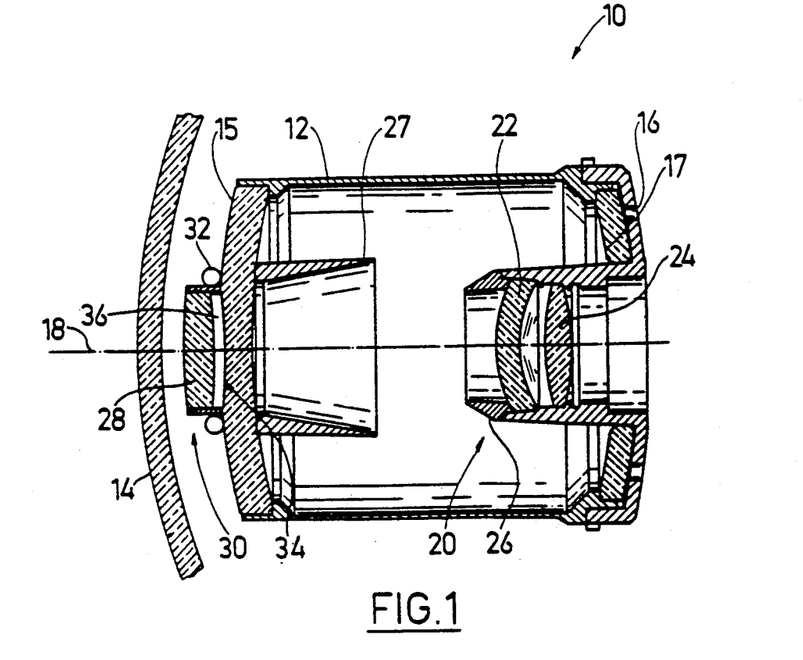
FIG. 1 shows a dual field of view optical system featuring a blocking element comprising a fluid reflective layer constructed and operated in accordance with the principles of the present invention.

Referring now to FIG. 1, there is shown a preferred embodiment of a dual field of view optical system 10 constructed and operated in accordance with the principles of the present invention. The optical system 10 comprises a cylindrical optical housing 12 located behind a window 14 through which objects are viewed. A lens 15 is affixed to one end of optical housing 12. The other end of optical housing 12 is defined by an end wall 16 to the inside of which there is affixed a concave mirror 17 providing a primary reflector (see FIG. 3). Disposed along an optical axis 18 and mounted in a centrally located hole through end wall 16 is a converting lens system 20 comprising a pair of lenses 22 and 24 which are enclosed by a rear baffle 26. A thin-walled conically-shaped front baffle 27 projects inwardly from the inner surface of lens 15 to reduce stray light reflections within housing 12.

In accordance with the principles of the present invention, lens 15 provides a narrow field of view and has mounted thereon in a central portion thereof a wide field of view lens 28. A blocking element 30 is disposed centrally along optical axis 18 and comprises a circumferential channel 32 and a transparent end wall 34 located behind and separated from lens 28 by an air gap 36. Circumferential channel 32 communicates with air gap 36 via an aperture (see FIG. 2). Within circumferential channel 32 there is normally stored a reflective fluid material 38, such as mercury, which may be pumped into air gap 36 to provide a reflective layer therein for blocking light coming from the object and entering through the wide field of view lens 28. Material 38 may be mercury, or other reflective fluid material.

Figure 2:
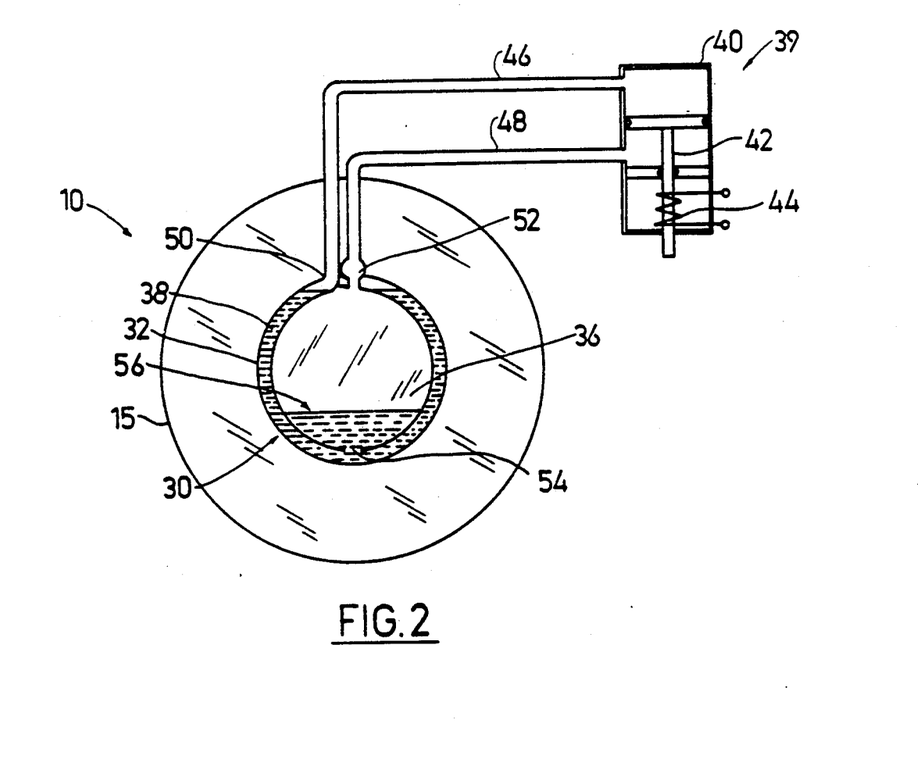
FIG. 2 shows a front view of the optical system of FIG. 1 and features apparatus for operating the blocking element.

Referring now to FIG. 2, there is shown a front view of the optical system 10 of FIG. 1 featuring apparatus 39 for operating blocking element 30. Apparatus 39 comprises a sealed cylindrical chamber 40 having a piston 42 which is slidably movable therein. Suitable means such as solenoid 44 is arranged to cause sliding movement of piston 42, which may be in response to an electrical control operation signal.

A portion of cylindrical chamber 40 on either side of piston 42 is in communication with one end of a respective one of tubes 46 and 48. Tube 46 is connected at its other end to an inlet end 50 of circumferential channel 32. The other end of tube 48 communicates with air gap 36 via an opening 52 therein. Another aperture 54 provides for communication between circumferential channel 32 and air gap 36. In this fashion, movement of piston 42 provides one of the volumes of circumferential channel 32 and that of air gap 36 with suction while providing compression of the other volume via respective tubes 46 and 48.

For example, when piston 42 moves to compress the volume of channel 32 via tube 46 and inlet end 50, a corresponding suction is provided to air gap 36 via tube 48 and opening 52. This effect is reversed when piston 42 is moved to compress the volume of air gap 36 via tube 48 and opening 52. Since circumferential channel 32 stores reflective fluid material 38, the suction/compression effect provided by movement of piston 42 causes reflective material 38 to be pumped in or out of air gap 36. When pumped into air gap 36, reflective material 38 forms a reflective fluid layer therein. As can be readily seen, the amount of piston 42 movement will determine the height 56 of the liquid level within air gap 36. Thus, blocking element 30 is selectably operable to block or enable passage of the light coming from the object through window 14.

It will be appreciated by those skilled in the art that the materials for construction of apparatus 39 will be those with which reflective fluid material 38 will not chemically react or encourage corrosion. In the case of mercury, permissible construction materials will include stainless steel, glass, and plastic, but not metals having an affinity for mercury.

Figure 3:
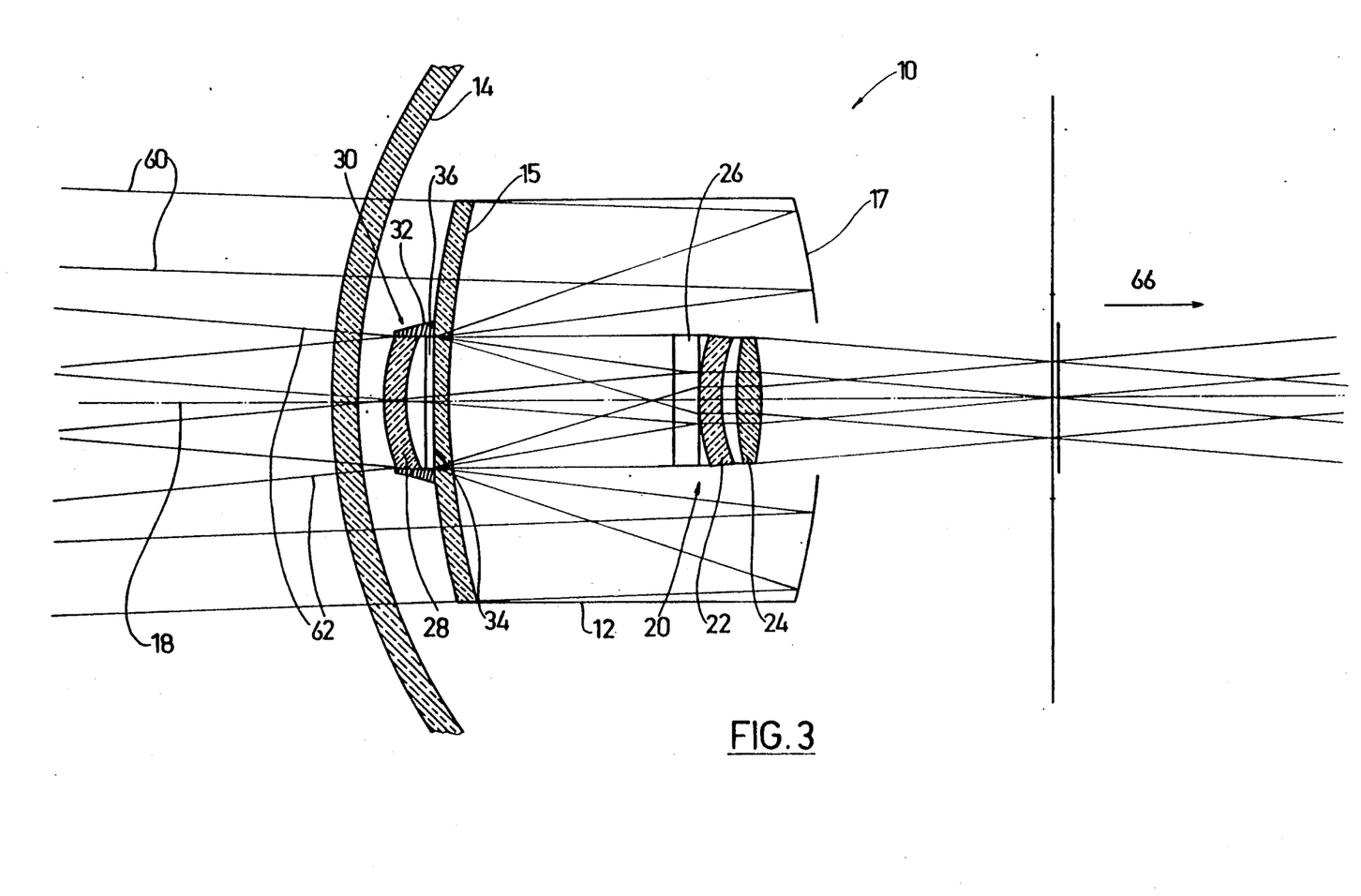
FIG. 3 shows the alternate optical paths of the image light rays associated with each of the dual fields of view in the optical system of FIG. 1.

Referring now to FIG. 3, there are shown the alternate optical paths of the image light rays associated with each of the dual fields of view in the optical system of FIG. 1. A narrow field of view is associated with the rays in a band 60 of light shown symmetrically disposed about optical axis 18, which rays pass through window 14 on either side of lens 28. A wide field of view is associated with the light rays forming a central beam 62 passing through lens 28. In accordance with the principles of the present invention, blocking element 30 is designed to be located in an aligned portion of the alternate optical paths associated with the wide and narrow fields of view.

When operated to provide a narrow field of view, reflective fluid material 38 is pumped by apparatus 39 (FIG. 2) into the normally transparent air gap 36 of blocking element 30 such that it provides a reflective fluid layer and acts as a secondary reflector in the form of a mangin mirror. Thus, the light from the narrow field of view associated with light band 60 reaches the primary reflector provided by concave mirror 17 in end wall 16 of optical housing 12. This light is reflected such that it converges on and is secondarily reflected from reflective fluid material 38, reaching the focal plane defined by converting lens system 20 from which it is relayed to the viewer or other detector in the direction of arrow 66.

Simultaneous with the operation of blocking element 30 to provide the narrow field of view, the light rays in central beam 62 associated with the wide field of view are blocked by the reflective fluid in air gap 36 such that they do not reach transparent end wall 34 and converting lens system 20.

When operated to provide a wide field of view, apparatus 39 pumps reflective fluid material 38 out of air gap 36 in blocking element 30 and restores it to circumferential channel 32. Since the reflective fluid layer is now absent, no secondary reflection is provided for light band 60 from the narrow field of view, and only the light of central beam 62 from the wide field of view reaches converting lens system 20 via transparent air gap 36.

As will be appreciated by those skilled in the art, the inventive optical system operates with minimal disturbance to the static balance which enables application in stabilized platform systems and stabilized sensor equipment, thereby offering a simplified solution in military viewing systems and commercial optical systems. The principle of minimal static balance disturbance is also incorporated in the alternative embodiments now presented.

Figure 4:
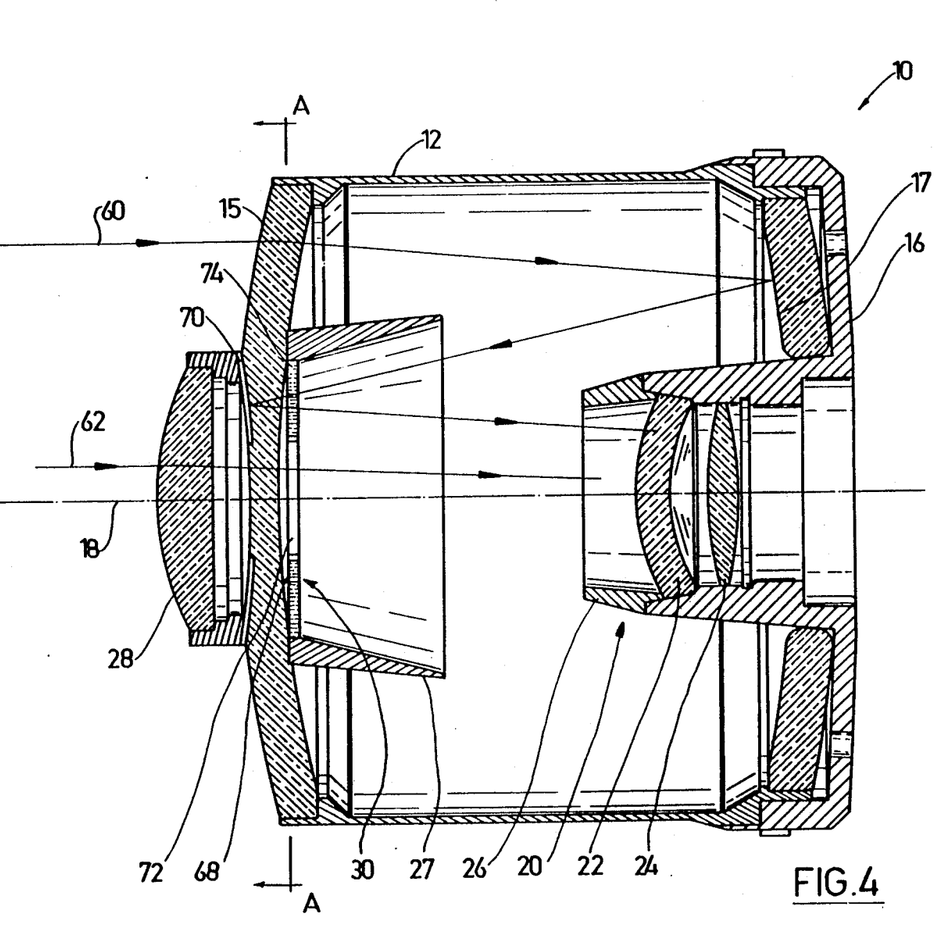
FIG. 4 shows an alternative embodiment of the optical system of FIG. 1 featuring a liquid crystal disc operable as the blocking element.
Figure 4A:
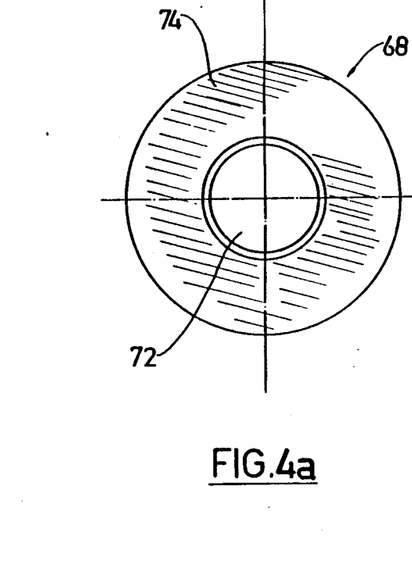
FIG. 4a is a section of the optical system of FIG. 4 taken along lines A—A, showing a front view of the liquid crystal disc.

Referring now to FIGS. 4-4a, there is shown an alternative embodiment of the optical system of FIG. 1 featuring a liquid crystal disc 68 operable as blocking element 30. A section of optical system 10 along lines A—A of FIG. 4 reveals a front view of liquid crystal disc 68. In this embodiment, wide field of view lens 28 is mounted on narrow field of view lens 15 and a ring-like portion 70 of an inner surface thereof is provided with a reflective coating.

Liquid crystal disc 68 is mounted across the face of front baffle 27 at the point where the latter joins the inner surface of lens 15. Disc 68 has a central aperture 72 which is enclosed by circumferential ring 74. Central aperture 72 and circumferential ring 74 are each separately operable by electrical means in a known manner so as to exhibit opaque or transparent properties.

As it is located in the aligned portion of the alternate optical paths, liquid crystal disc 68 can be operated so that circumferential ring 74 becomes opaque and blocks the image light in band 60 associated with the narrow field of view. Simultaneous with operation of disc 68 to block the narrow field of view, central aperture 72 remains transparent and enables passage of the image light in central beam 62 associated with the wide field of view.

Alternatively, to provide the narrow field of view, liquid crystal disc 68 can be operated to enable passage of the light in band 60 through circumferential ring 74 while blocking the passage of light in beam 62 through central aperture 72. In this case, the reflective coating in ring-like portion 70 of the inner surface of lens 28 acts as a secondary reflector from which the light in band 60 is reflected in a catadioptric arrangement, finally reaching converting lens system 20.

Figure 5:
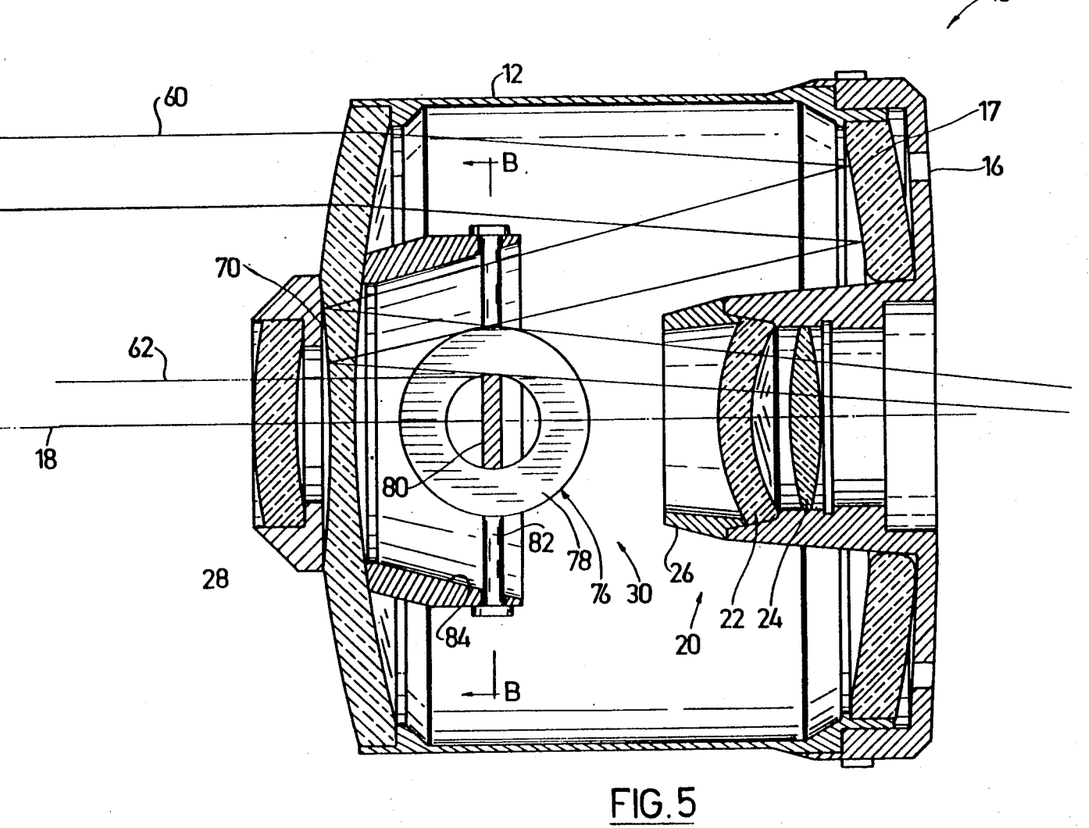
FIG. 5 shows an alternative embodiment of the optical system of FIG. 1 featuring a pivotally movable disc-ring construction operable as the blocking element for providing a narrow field of view.
Figure 5A:
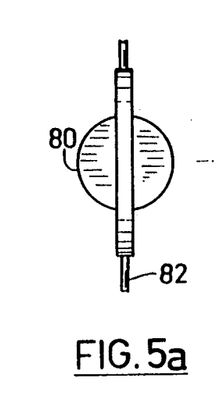
FIG. 5a is a section of the optical system of FIG. 5 taken along lines B—B, showing a front view of the disc-ring construction.
Figure 6:
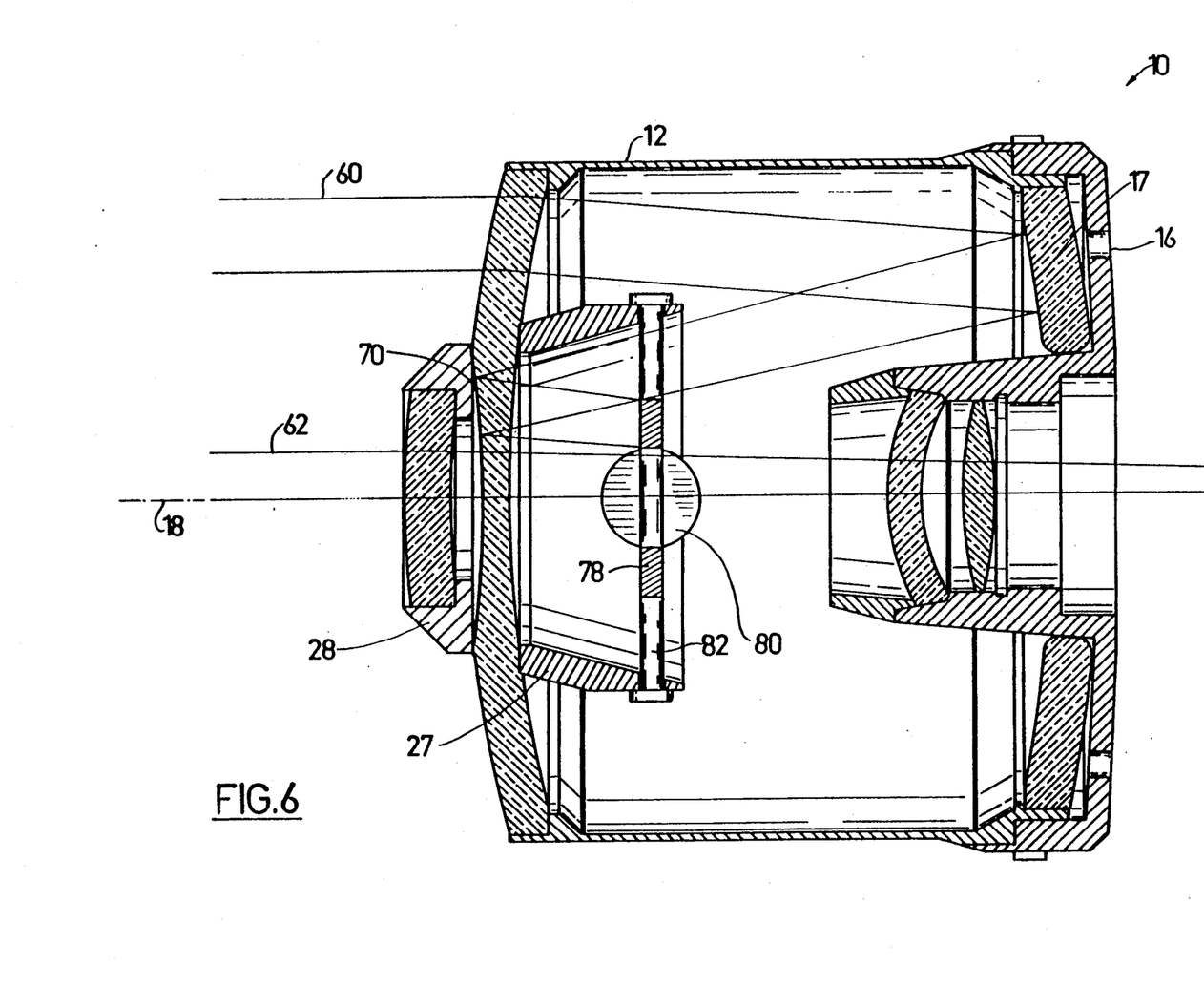
FIG. 6 shows the optical system of FIGS. 5--5a in which the disc-ring construction is operated as the blocking element for providing the wide field of view.

Turning now to FIGS. 5, 5a and 6, there is shown another alternative embodiment of the optical system of FIG. 1 featuring a disc-ring construction 76 operable as blocking element 30 to provide a narrow field of view. The optical system is identical to that of FIG. 4 with the exception that the function provided therein by liquid crystal disc 68 is provided by disc-ring construction 76 in this embodiment.

Disc-ring construction 76 comprises thin opaque material formed as a circumferential ring-shaped portion 78 within which there is orthogonally mounted a central disc portion 80 having magnetic properties. Construction 76 is supported by a rod 82 extending vertically from the outside edges of circumferential ring portion 78, which rod 82 is pivotably mounted in the inner wall 84 of front baffle 27. An electrical coil embedded in baffle 27 is operable by electrical means to create a magnetic field for pivoting disc portion 80 on rod 82. A spring-return mechanism (not shown) can be used to restore disc portion 80 to its original position.

In accordance with the principles of the present invention, disc-ring construction 76 is located in the aligned portion of the alternate optical paths. When pivoted as shown in FIG. 5, the opaque central disc portion 80 blocks the image light in beam 62 associated with the wide field of view. This can more readily be seen in the view provided by FIG. 5a, wherein a section of optical system 10 is shown taken along lines B—B of FIG. 5. In FIG. 5a, opaque central disc portion 80 is visible, and is shown oriented so as to block the image light in beam 62 which is directed into the page.

Simultaneously, the plane of the circumferential ring portion 78 is then oriented parallel to the optical path associated with the narrow field of view. Thus, passage of the light in band 60 is enabled, and this light is reflected from the secondary reflector provided by surface 70 in a catadioptric arrangement into the aligned portion of the optical paths, where converting lens system 20 makes it available for detection.

As shown in FIG. 6, when circumferential ring portion 78 is pivoted 90° so as to block the light in band 60 associated with the narrow field of view, the central disc portion 80 is oriented parallel to the optical path associated with the wide field of view and passage of the light in beam 62 is enabled.

In summary, it can be seen that the present invention offers a dual field of view optical system which is based on a simplified optical arrangement using a blocking element in the optical path, operating with minimal optical system disturbances.

Having described the invention in connection with certain specific embodiments thereof, it is to be understood that the description is not meant as a limitation since further modifications may now suggest themselves to those skilled in the art and it is intended to cover such modifications as fall within the scope of the appended claims.

We claim:

1. An optical system for transmitting light from an object in a dual field of view, said system comprising:
   optical means providing alternate optical paths associated with each of a wide and a narrow field of view, at least a portion of the alternate optical paths being in alignment; and
   mechanically operable blocking means disposed within said aligned portion of the alternate optical paths and being selectably operable to enable passage of the light from the object which is associated with one of the alternate optical paths while simultaneously blocking passage of the light associated with the other alternate optical path, wherein said blocking means comprises a pivotably movable disc-ring construction of thin opaque material having a central disc fixedly mounted within a circumferential ring in orthogonal orientation therewith.

2. The system of claim 1 wherein said one of the alternate optical paths is associated with a wide field of view and said other of the alternate optical paths is associated with a narrow field of view.

3. The system of claim 1 wherein said disc-ring construction is pivotable so that said circumferential ring blocks the light associated with the narrow field of view while the plane of said central disc is simultaneously oriented parallel to the optical path associated with the wide field of view for enabling passage of the light therein.

4. The system of claim 1 wherein said disc-ring construction is pivotable so that said central disc blocks the light associated with the wide field of view while the plane of said circumferential ring is simultaneously oriented parallel to the optical path associated with the narrow field of view for enabling passage of the light therein, the enabled light being reflected in a catadioptric arrangement into the aligned portion of the alternate optical paths.

5. A stabilized platform system incorporating stabilized sensor equipment and employing the dual field of view optical system of claim 1.

6. An optical system for transmitting light from an object in a dual field of view, said system comprising:
   optical means providing alternate optical paths associated with each of a wide and a narrow field of view, at least a portion of the alternate optical paths being in alignment; and
   blocking means disposed within said aligned portion of the alternate optical paths and being selectably operable to enable passage of the light from the object which is associated with one of the alternate optical paths while simultaneously blocking passage of the light associated with the other alternate optical path, wherein said blocking means comprises:
   a pair of lenses forming an air gap therebetween, said lens pair being located in said aligned portion of the alternate optical paths;
   circumferential channel means in communication with said air gap and being affixed about said lens pair;
   fluid reflective material contained in said channel means; and
   pumping means in communication with said channel means for reversibly pumping said fluid reflective material into and out of said air gap.

7. The system of claim 6 wherein pumping of said fluid reflective material into said air gap from said channel blocks the light from the object which is associated with the wide field of view while simultaneously enabling passage of the light from the narrow field of view by reflection in a catadioptric arrangement into said aligned portion of the alternate optical paths.

8. The system of claim 7 wherein pumping of said fluid reflective material out of said air gap so as to restore the air therein causes said blocking means to lose its reflective capability and enables direct passage of the light associated with the wide field of view.

9. The system of claim 6 wherein pumping of said fluid reflective material out of said air gap so as to restore the air therein causes said blocking means to lose its reflective capability and enables direct passage of the light associated with the wide field of view.

10. The system of claim 6 wherein said fluid reflective material comprises liquid mercury which is stored in said circumferential channel.

11. An optical system for transmitting light from an object in a dual field of view, said system comprising:
    optical means providing alternate optical paths associated with each of a wide and a narrow field of view, at least a portion of the alternate optical paths being in alignment, wherein one of the alternate optical paths is associated with a wide field of view and said other of the alternate optical paths is associated with a narrow field of view; and
    blocking means disposed within said aligned portion of the alternate optical paths and being selectably operable to enable passage of the light from the object which is associated with one of the alternate optical paths while simultaneously blocking passage of the light associated with the other alternate optical path, wherein said blocking means comprises:
    a pair of lenses forming an air gap therebetween, said lens pair being located in said aligned portion of the alternate optical paths;
    circumferential channel means in communication with said air gap and being affixed about said lens pair;
    fluid reflective material contained in said channel means; and
    pumping means in communication with said channel means for reversibly pumping said fluid reflective material into and out of said air gap.

12. An optical system for transmitting light from an object in a dual field of view, said system comprising:
    optical means providing alternate optical paths associated with each of a wide and a narrow field of view, at least a portion of the alternate optical paths being in alignment; and
    blocking means disposed within said aligned portion of the alternate optical paths and being selectably operable to enable passage of the light from the object which is associated with one of the alternate optical paths while simultaneously blocking passage of the light associated with the other alternate optical path, wherein said blocking means comprises a liquid crystal device in the form of a disc having a central aperture which is enclosed by a circumferential ring, each of said central aperture and circumferential ring being separately operable so as to exhibit interchangeable opaque and transparent properties.

13. The system of claim 12 wherein said liquid crystal device is operable so that said circumferential ring is opaque and blocks the image light associated with the narrow field of view while said central aperture is simultaneously transparent and enables passage of the image light associated with the wide field of view.

14. The system of claim 12 wherein said liquid crystal device is operable so that said central aperture is opaque and blocks the light associated with the wide field of view while said circumferential ring is transparent and enables passage of the light associated with the narrow field of view, the enabled light being reflected in a catadioptric arrangement into said aligned portion of the alternate optical paths.

15. A method for transmitting light from an object in a dual field of view, said method comprising the steps of:
    providing alternate optical paths associated with each of a wide and a narrow field of view, at least a portion of the alternate optical paths being in alignment; and
    selectably operating blocking means disposed within said aligned portion of the alternate optical paths to enable passage of the light associated with one of the alternate optical paths while simultaneously blocking passage of the light associated with the other alternate optical path, said selectably operating step comprising:
    providing a pair of lenses forming an air gap therebetween, said lens pair being located in said aligned portion of the alternate optical paths;
    providing about said lens pair a circumferential channel in communication with said air gap, said channel containing fluid reflective material; and
    reversibly pumping said fluid reflective material into and out of said air gap by communication with said channel.

16. A method for transmitting light from an object in a dual field of view, said method comprising the steps of:
    providing alternate optical paths associated with each of a wide and a narrow field of view, at least a portion of the alternate optical paths being in alignment; and
    selectably operating blocking means disposed within said aligned portion of the alternate optical paths to enable passage of the light associated with one of the alternate optical paths while simultaneously blocking passage of the light associated with the other alternate optical path,
    wherein said selectably operating step comprises:
    providing a liquid crystal device in the form of a disc having a central aperture which is enclosed by a circumferential ring; and
    applying electrical signals separately to each of said central aperture and circumferential ring so that each exhibits interchangeable opaque and transparent properties.

17. A method for transmitting light from an object in a dual field of view, said method comprising the steps of:
    providing alternate optical paths associated with each of a wide and a narrow field of view, at least a portion of the alternate optical paths being in alignment; and
    selectably operating blocking means disposed within said aligned portion of the alternate optical paths to enable passage of the light associated with one of the alternate optical paths while simultaneously blocking passage of the light associated with the other alternate optical path, wherein said selectably operating step comprises:
    providing a pivotably movable disc-ring construction having a magnetically sensitive opaque central disc fixedly mounted within an opaque circumferential ring in orthogonal orientation therewith; and
    applying a magnetic field to said disc-ring construction to orient said magnetically sensitive central disc in one of parallel and orthogonal orientations with respect to the optical path associated with the narrow field of view, while providing the opposite orientation with respect to the alternate optical path, removal and application of said magnetic field alternately blocking and enabling passage of the light in each of the alternate optical paths.

* * * * *

UNITED STATES PATENT AND TRADEMARK OFFICE
CERTIFICATE OF CORRECTION

PATENT NO.   :   5,113,281
DATED        :   May 12, 1992
INVENTOR(S)  :   Mandelboum et al.

It is certified that error appears in the above-identified patent and that said Letters Patent is hereby corrected as shown below:

Cover page, line designated as [73]:

Assignee is listed as "State of Isreal-Ministry of Defence Armg332 2evelopment Authority, Israel:

it should read as follows:

--State of Israel-Ministry of Defence Armament Development Authority, Israel--

Signed and Sealed this

Seventh Day of September, 1993

Attest:

BRUCE LEHMAN

*Attesting Officer*      *Commissioner of Patents and Trademarks*